C. D. SEEBERGER.
CONVEYER.
APPLICATION FILED JUNE 2, 1906. RENEWED JUNE 14, 1909.
984,304.
Patented Feb. 14, 1911.
5 SHEETS—SHEET 2.
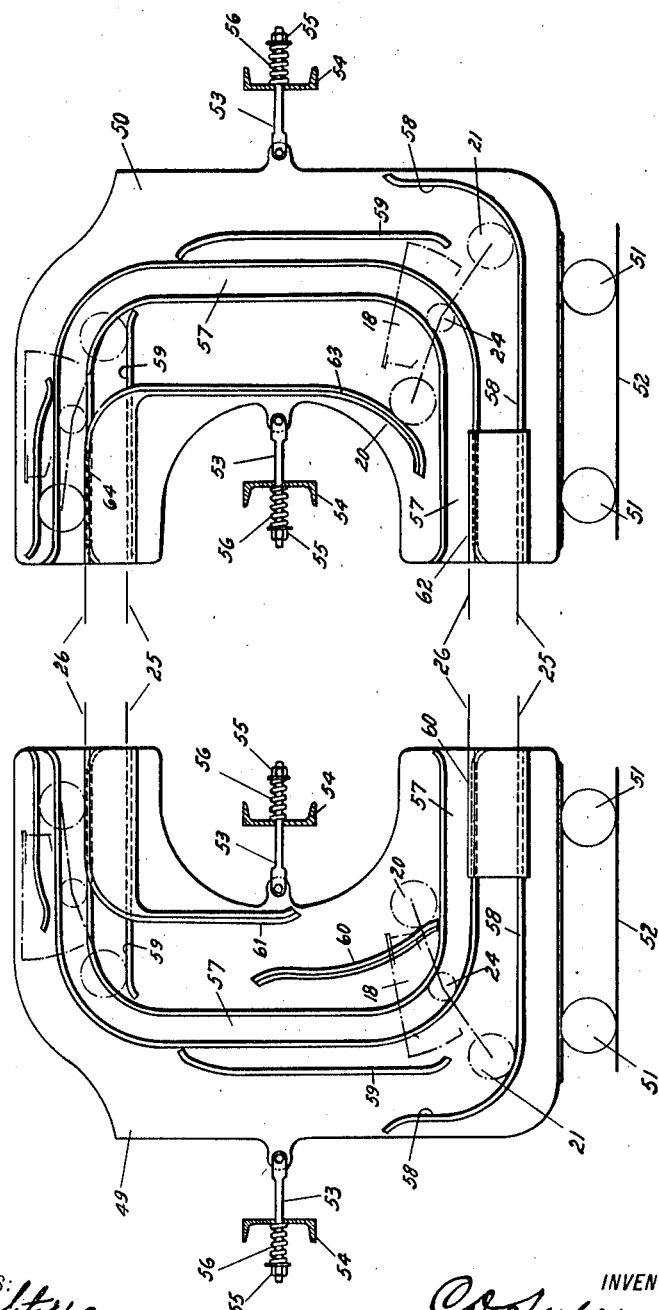
WITNESSES:
INVENTOR
ATTORNEYS C. D. SEEBERGER.
CONVEYER.
APPLICATION FILED JUNE 2, 1906. RENEWED JUNE 14, 1909.
984,304.
Patented Feb. 14, 1911.
5 SHEETS—SHEET 1.
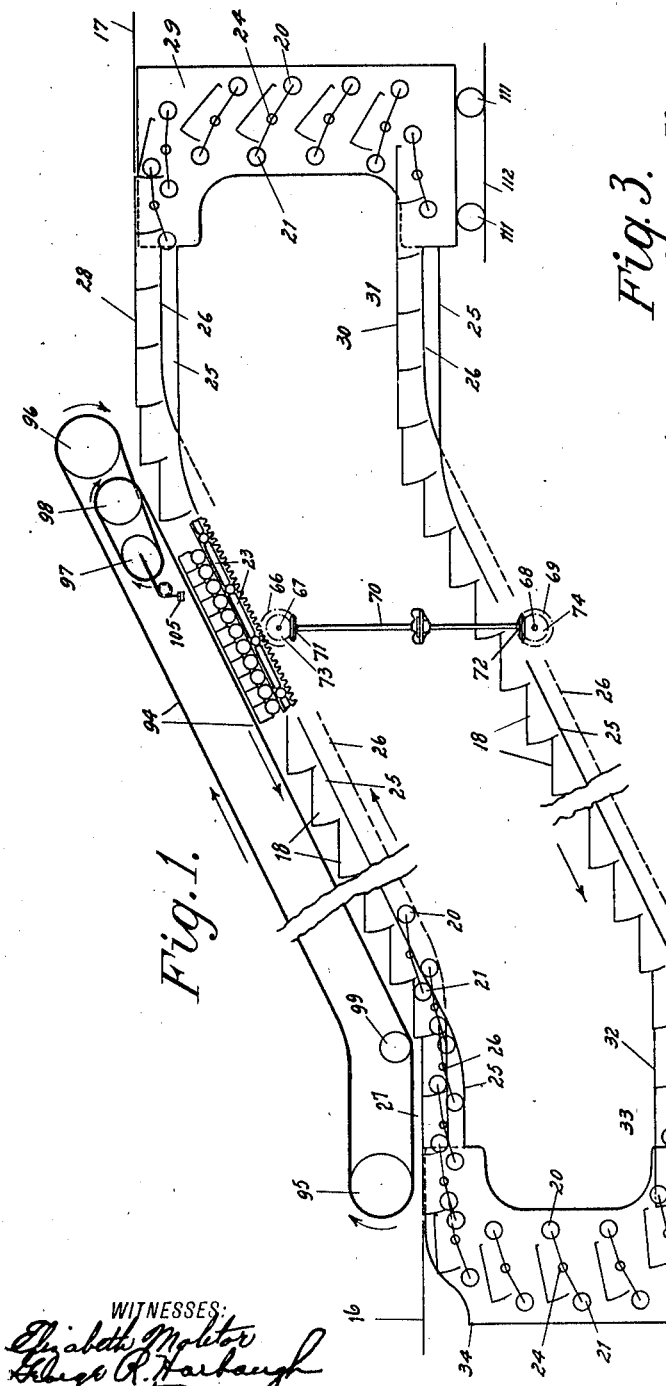
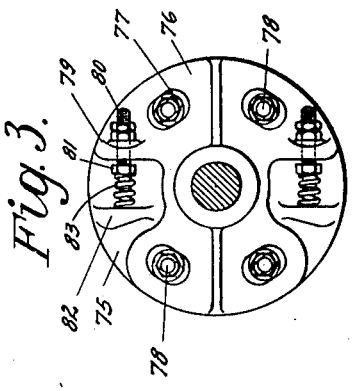
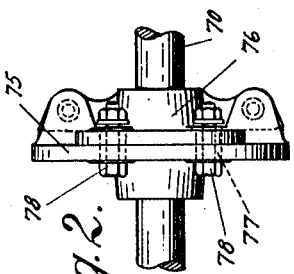
WITNESSES:
INVENTOR
C. D. Seeberger
BY Coburn & McRoberts
his ATTORNEYS

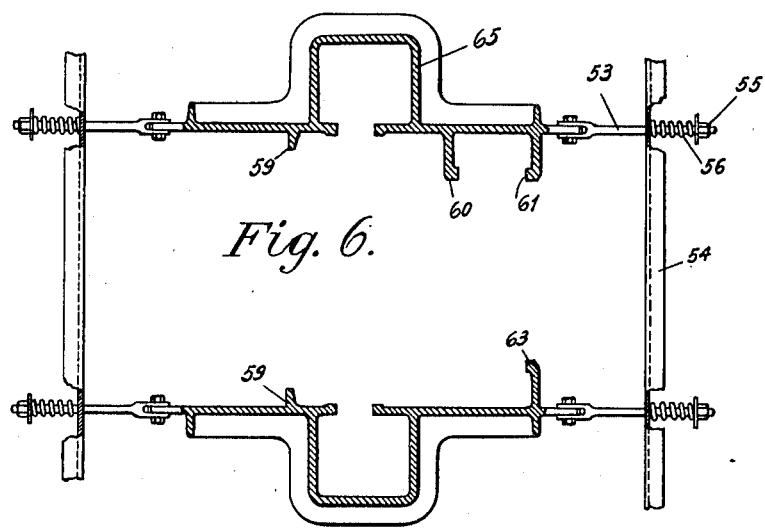
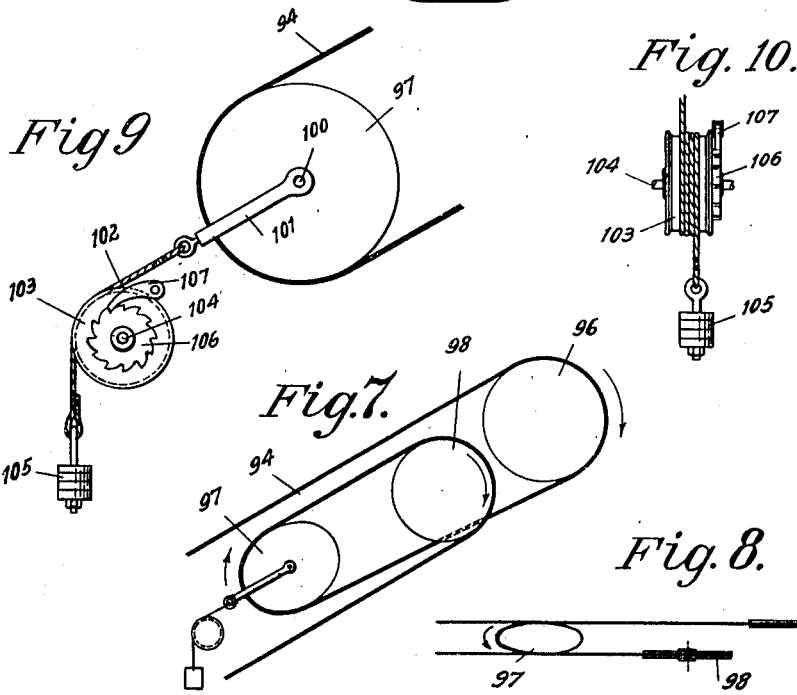

C. D. SEEBERGER.
CONVEYER.
APPLICATION FILED JUNE 2, 1906. RENEWED JUNE 14, 1909.
984,304.
Patented Feb. 14, 1911.
5 SHEETS—SHEET 4.
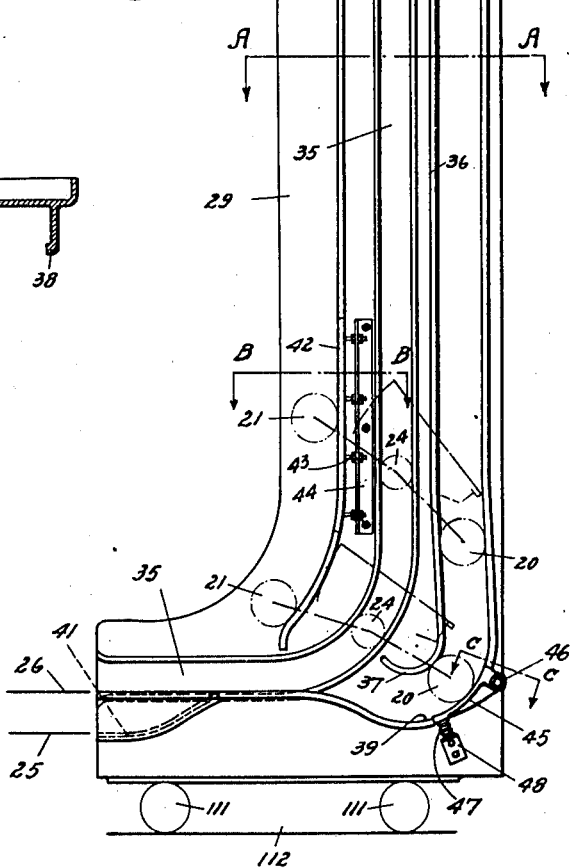
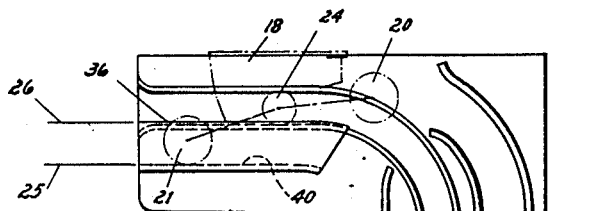
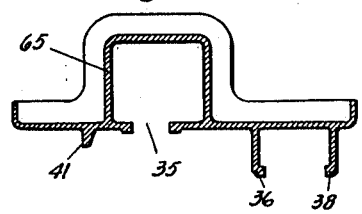
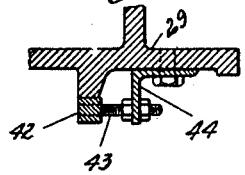
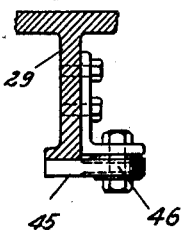

C. D. SEEBERGER.
CONVEYER.
APPLICATION FILED JUNE 2, 1906. RENEWED JUNE 14, 1909.
984,304.
Patented Feb. 14, 1911.
5 SHEETS—SHEET 5.
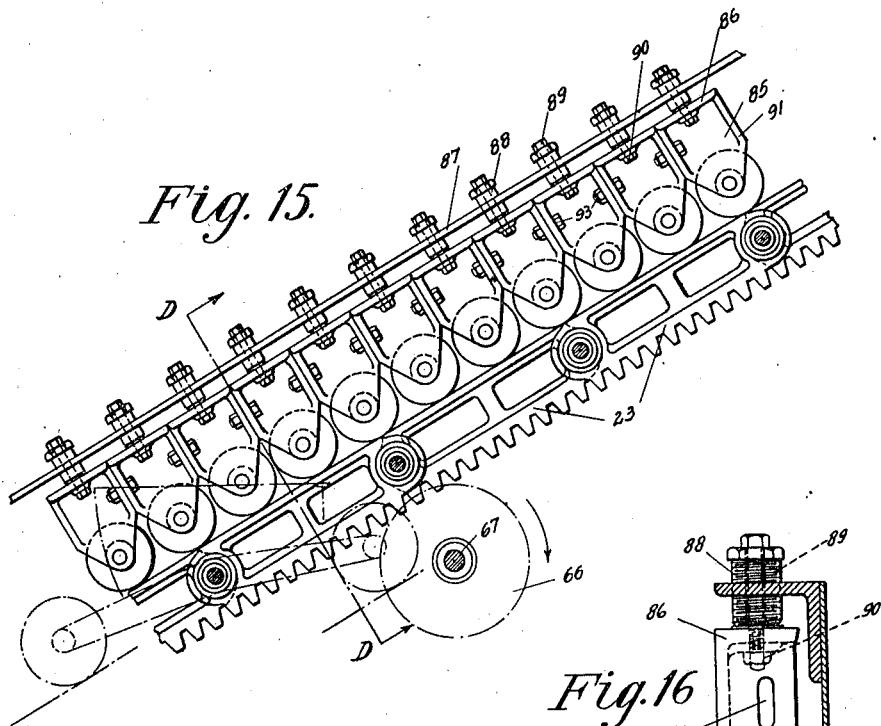
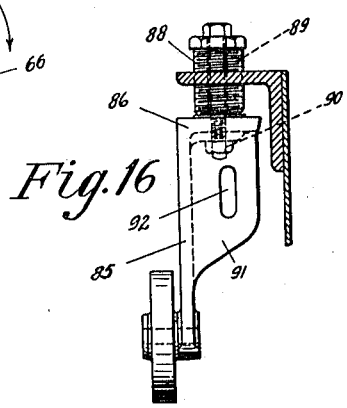
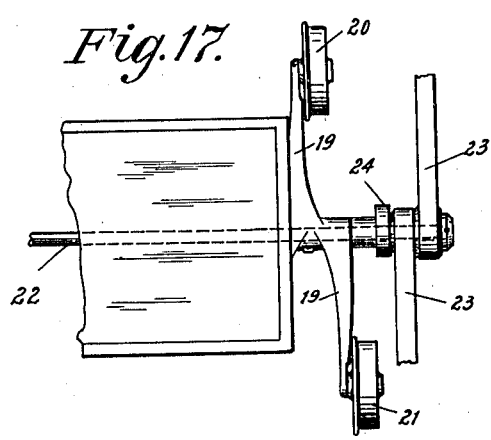
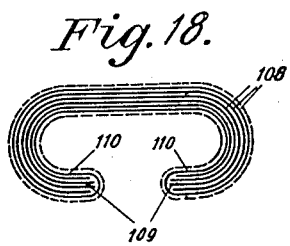
WITNESSES:
INVENTOR
BY
ATTORNEYS

UNITED STATES PATENT OFFICE.

CHARLES D. SEEBERGER, OF YONKERS, NEW YORK.

CONVEYER.

984,304.     Specification of Letters Patent.     Patented Feb. 14, 1911.

Application filed June 2, 1906. Serial No. 319,852. Renewed June 14, 1909. Serial No. 502,135.

*To all whom it may concern:*

Be it known that I, CHARLES D. SEEBERGER, a citizen of the United States, residing at Yonkers, in the county of Westchester and State of New York, have invented certain new and useful Improvements in Conveyers, of which the following is a specification, reference being had therein to the accompanying drawings.

This invention relates to conveyers, and particularly to that type of conveyers in which a traveling footway, preferably in the form of a series of connected steps, extends between different levels and is adapted to carry or transport freight or passengers upon both its ascending and descending runs.

The invention has for its object generally to provide certain improvements in machines of this character, and it consists in the organizations and arrangements of parts hereinafter particularly described and then pointed out in the appended claims.

In the accompanying drawings, illustrating an embodiment of the various features of my invention,—Figure 1 is a diagrammatic view showing the general arrangement and disposition of a conveyer arranged in the form of a traveling footway and embodying my invention, portions of the runs being broken out for convenience of illustration; Figs. 2 and 3 are a side and a face view, respectively, on an enlarged scale, of a yielding driving connection between the upper and lower runs of the machine; Fig. 4 is an inner face view of one side section of the end-carriage or reverser at the bottom of the machine, and Fig. 5 a similar view of the inner face of the other section, such sections being spread apart or opened away from each other and showing the relative positions of the ends of a step; Fig. 6 is a central horizontal sectional view of the lower end-carriage; Fig. 7 is a detail view of the upper end of the hand-rail shown in Fig. 1; Fig. 8 is a plan view of the construction shown in Fig. 7; Fig. 9 is a detail view in side elevation on an enlarged scale particularly illustrating a take-up device that may be employed with the hand-rail; Fig. 10 is an end view of the same; Fig. 11 is an inner face view of one section of the end-carriage or reverser at the top of the machine; Figs. 12, 13 and 14 are sectional views on the lines A—A, B—B, and C—C, respectively, of Fig. 11, looking in the direction of the arrows; Fig. 15 is a detail view on an enlarged scale of an upthrust which may be employed with the conveyer and showing the associated step-links and driving pinion; Fig. 16 is a sectional view on the line D—D of Fig. 15; Fig. 17 is a plan view of one of the steps and connecting links; and Fig. 18 is a diagrammatic cross-sectional view of a hand-rail.

The footway or conveyer is adapted to travel on suitable tracks between different levels and to transport passengers or freight on both its ascending and descending runs, the numerals 16 and 17 indicating the lower floor or level and the upper floor or level, respectively, with reference to which the conveyer is so arranged as to simultaneously carry in both directions. The footway or carrier is preferably in the form of a connected series of steps 18 each of which is provided with the usual tread and riser. The wheel-base is provided at each end with oppositely extending arms 19 to which the front and rear wheels 20 and 21, respectively, are pivoted in different vertical planes, the wheels 21 in the present instance being the outer wheels. The arms of the wheel-base extend beyond the front and rear edges of the steps to form wheel-bases wider than the steps, and are inclined with reference to each other and to such degree as to properly locate the wheels thereof on upper and lower tracks associated therewith to maintain the treads of the steps horizontal while moving on the ascending and descending runs. The step-axles 22 extend beyond or outside the wheel-base and have pivoted thereto the links 23 which connect the steps. These links, in the present case, are in the form of rack-links, having the edges opposite the teeth flat, and between the links and wheel base is a contact surface which preferably takes the form of a roller 24 pivoted on the axle-bar and the purpose of which will be hereinafter explained.

The footway is adapted to travel on upper and lower ways each of which is provided with upper and lower tracks 25 and 26, respectively, upon which the rear and front wheels 21 and 20, respectively, roll, and these ways extend on inclines between the levels and in horizontal planes at the levels. On the upper way, as shown in Fig. 1, the track 25 for the rear wheels crosses the track 26 adjacent to the ends of the incline so as to be located under the track 26 at the landings but above it on the incline. This arrangement of the tracks is also true of the lower way. Assuming that the upper way provides for transportation on the ascent and the lower way on the descent, which arrangement may of course be reversed if desired, the arrangement of the tracks is such that the steps are presented to the lower level 16 with their treads in the same horizontal plane to form a lower get-on or entry landing 27, then break into step-like formation as they travel upwardly in the direction of the arrow upon the incline portion of the upper way and again are presented with their treads in the same horizontal plane to form the get-off or exit landing 28 at the upper level. Beyond the upper landind the steps pass through a suitable end-carriage 29 by which they are reversed in direction of travel and presented with their treads in the same horizontal plane to the entry landing 30 of the descending run, such landing being formed at a suitable gallery 31 located under the upper landing 28 and to which access may be had by a suitable stairway (not shown) from the upper landing, the entry to the steps preferably being from either or both sides thereof. After leaving the landing 30 the steps again break into step-like formation on the incline of the return run, and at the bottom are again presented with the treads thereof uppermost in the same horizontal plane to form an exit landing 32 at a gallery 33 located under the lower level, the exit being preferably at the sides. From the landing 32 the steps pass to and enter an end-carriage 34, which reverses the direction of movement of the steps and presents them to the landing 27 with their treads uppermost.

The carriage 29 at the upper end of the machine consists of two similar sections, one located at each side of the stairway and having its inner face provided with suitable tracks and a channel-guide 35 for the guide rollers 24 or other equivalent device with which the ends of the axle bars of the steps may be provided, although the axles themselves may coöperate directly with the channel guides 35 if desired. The channel-guides extend through the carriage in the general form of the letter C, their ends or terminals facing or opening in the same direction and in the line of movement of the guide rollers 24 as the steps move on the tracks. Each section of the carriage 29 is provided with a track 36 which at the entrance to the carriage is in line with the horizontal portion of the track 26 at the upper landing and then after crossing the channel in a curve extends downwardly outside of the channel guide to near the bottom of the carriage where it terminates in an abrupt inwardly curved portion 37. The track 36 at the point where it crosses the channel-guide is cut away to permit of the passage of the extended axle bars 22. A guard track 38 which is parallel with the track 36 and located at the opposite side with reference to the channel-guide extends from near the upper end of the carriage to the bottom thereof, and after forming a curve 39 substantially concentric with the curve 37 in the track 36 extends in a horizontal direction in line with the horizontal landing portion of the track 26 of the lower way. A short horizontal track 40 in line with the horizontal landing portion of the track 25 is located at the entrance to the carriage 29 for the rear wheels 21 which pass into engagement with a vertical track 41 parallel with and at the inner side of the vertical portion of the channel guide 35. The track 41 is curved at its lower end and cut-away to cross the channel guide and terminates at the exit of the carriage in line with the horizontal portion 25 of the lower way.

In order to prevent slippage of the wheels and their striking with a blow at the bottom of the carriage, I provide a pressure device which increases the traction of the wheels on their tracks. For this purpose I provide an adjustable track-section. In the form shown the track 41 is recessed at or near the beginning of its curve, as shown in Fig. 11, and an adjustable track-section 42 is supported in this recess by means of screw-bolts 43 which pass through threaded apertures in a plate 44 secured to the carriage. The section 42 may be adjusted in proper position by turning the bolts 43 which are then held in position by suitable set nuts. By adjusting the section toward the wheels 21, the wheels 20 are also more firmly held against their track 38. The pivot point of the step arms is of course at the rollers 24, and by increasing the pressure of the plate 42 upon the wheels 21 the tendency is to swing the arms about the rollers 24 as pivots and to force the wheels 20 into closer contact with the tracks 38. This increased traction prevents the wheels from slipping through the vertical portions of the carriage and thereby prevents blow of the wheels at the bottom of the carriage. In order to take up the shock of any blow which may accidentally occur I further provide a spring section 45 located in a recess of the track 38 at its curve, as shown in Figs. 11 and 14. The section 45 is pivoted at 46 and pressed inwardly by a spring 47 which reacts between a stationary abutment 48 and the pivoted section.

The end carriage 34 at the lower end of the machine is shown in detail in Figs. 4 and 5, and as there shown consists of two sections 49 and 50, one located at each side of the machine and provided on the inner face thereof with suitable tracks with which the wheels of the steps coöperate. The two sections may be connected and supported in any desired manner. As shown in Figs. 1, 4 and 5 each section of the end-carriage rests upon rollers 51 supported by tracks or ways 52. Each section of the carriage is provided with oppositely extending rods 53 passing through suitable apertures in cross beams 54 which may be fixed to the supporting structure of the machine in any suitable manner. The ends of the rods 53 are provided with adjustable shoulders such as the nuts 55, which are in threaded engagement with the rods, and between which and the beams are expansion springs 56. These springs are designed to be adjusted by movement of the nuts so as to counterblance each other and thereby balance the carriage. By reason of the construction described the carriage being mounted on the rollers is free to move longitudinally of the conveyer to compensate for inequalities in the motion of the latter or differences between the length of the path of travel and the length of the connected series of steps, and then be returned by the springs to its normal balanced position after such action ceases. While I have shown springs for accomplishing this result any other suitable means may be employed as for example counterbalance weights. The carriage 29 at the upper end of the machine may be supported and adjusted in a similar manner to the carriage 34.

The inner face of each section of the end-carriage 34 is provided with a channel-guide 57 for the guide rollers 24 or their equivalents, and which extends through the carriage in the general form of a letter C, its ends or terminals facing or opening in the same direction and in the line of movement of the guide rollers 24. Each section of the carriage 34 is also provided with a way for the adjacent outside step wheel 21 which is formed by a track 58, extending below the channel-guide at its inlet in a horizontal direction in line with the horizontal landing portion of its associated track 25 to substantially the rear part of the carriage where it is bent or directed upwardly, and with an associated track 59 which originates at a point substantially opposite the terminal of the upwardly extending portion of the track 58 and continues in an upward and inward direction to and across the channel-guide 57 under the exit end of which it continues in a horizontal plane to the exit of the carriage where it connects with the horizontal landing portion of the track 25 on the upper way, being cut away where it crosses the channel-guide to allow the projecting axles of the steps to pass. The arrangement of the tracks for the outer wheels of the steps is the same thus far for both sections. The tracks for the inside wheels 20, however, are different. The track 60 for the wheels 20 in one of the sections, as 49, is in the same horizontal plane as the lower portion of the channel-guide 57 and as the way for the wheel 20 crosses the channel-guide before the latter bends upwardly the track 60 is cut away at the point of crossing to allow the axles 22 to pass, and then extends upwardly in a curve inside of the line of the channel guide. At about the terminal of the track 60 a second track 61, oppositely spaced from the track 60, continues upwardly and then curves toward the outlet of the carriage in the same horizontal plane as the lower portion of the channel guide 57 at its exit and in the line of the horizontal landing portion of the track 26 of the ascending run. The track 62 for the inside wheels at the opposite ends of the steps and associated with the section 50, is located at the level of the lower portion of the channel guide, and at a point above the upper portion of the channel-guide at the inlet of the latter a track 63 begins and curves upwardly as shown in Fig. 5, terminating in an upper portion 64 arranged in a similar manner to the track 61. The tracks 60 and 63 curve in the same general direction, but differ in the respect that while the track 60 is inside of the line of movement of the wheels 20 the track 63 is outside, the said tracks being in a sense opposed or oppositely facing, as shown in Fig. 6. The track 63 controls the front wheels 20 of the steps during the first part of the movement as the steps pass through the curve at the inlet end of the carriage, while the track 60 controls such wheels during the latter part of the movement through this curve. This will be understood by reference to Figs. 4 and 5 where it will be seen that, as the center of gravity is between the axle and the riser of the step, the step will have a tendency to tilt on its axle and swing the wheel 20 in the direction of the arrow and out of engagement with the track 60. At this point, which occurs where the track 60 practically coincides with an arc struck from the center of the axle of the step, this tendency to swing and cause the wheel to skip the track, is not avoided by the track 58 as the latter at the curve is tangential to the wheel. The skipping of the wheel is, however, prevented by the track 63 which is outside of the wheel and so located that the wheel is in tractional contact therewith. As one wheel leaves the curved portion of the track 63 which then becomes non-effective, the track 60 becomes effective so as to resist any tendency of the wheels to swing about the axle of the step. By this arrangement of tracks one of the wheels 20 of each step is always in tractional engagement with a track so that the slippage or skipping of the wheels and overturning of the steps is prevented.

Each section of the carriages 29 and 34 is divided by the channel-guide thereof, as shown in Figs. 6 and 12, and the divisions are connected by hollow webs 65 which provide spaces to receive the links connecting the steps outside the supporting wheels.

It is obvious that the features involved in the present construction of the end-carriage or reversers are applicable to machines carrying or transporting on only a single run or in one way as well as to duplex machines or those transporting on both runs.

The footway has been assumed in the foregoing description to ascend on its upper run. It is obvious, however, that the directions of movement may be reversed, in which case the upper run would be used for descending and the lower for ascending.

Power is applied to drive the conveyer by suitable sprockets one of which, 66, engages a line of rack links 23 connecting the axle bars at each end of the steps. These sprockets are fixed to a driving cross-shaft 67 suitably journaled on the supporting structure and so positioned that the sprockets engage the links near the top of the ascending line. Preferably motion is also imparted to the descending series of steps, and in order to balance the ascending and descending series the drive for the descending series is driven by a connection from the drive shaft 67. To this end a shaft 68 is suitably journaled on the supporting structure and provided with sprocket wheels 69 which engage the links connecting the descending series of steps. A vertical shaft 70 is provided with bevel gears 71 and 72 which mesh with bevel gears 73 and 74 on the shafts 67 and 68, respectively. By this arrangement both the ascending and descending series of steps are driven positively and in unison and counterbalance each other. The shaft 70 is preferably a sectional shaft consisting of two parts having a yielding coupling. This coupling consists in the present instance of a pair of members 75 and 76 fixed to the abutting ends of the two parts of the shaft, as shown in Fig. 2. One of the members, as 76, is provided with slots 77 which are concentric with the shaft and through which pass bolts 78 which also pass through the other member 75. These bolts do not secure the members rigidly together, but merely serve to keep the ends of parts of the shaft alined. One of the members, as 76, is provided with lateral lugs 79 having threaded apertures through which pass threaded bolts 80. These bolts are formed with heads 81 between which and the shoulders 82 on the member 75 are located expansion springs 83. These springs are put under compression by screwing the bolts 80 in the same direction, and normally the two members are so related that the bolts 78 occupy the center of the slots 77. The springs 83 are normally set to such tension as to render the shaft 70 substantially rigid, but are adapted to yield when the resisting force exceeds such tension. With this arrangement the sprockets may be adjusted so as to properly engage the teeth of the links connecting the steps, and in the event of shifting of the structural work of the machine in either direction by contraction or other cause, or in case of other abnormal conditions tending to cause the links to ride the sprockets, such sprockets will yield by reason of the yielding of the springs against which the resisting force acts so as to maintain the sprockets in proper relation to the links. The action of the driving sprockets in engagement with the links tends to lift the steps and also to turn the links upon the axles when the sprockets engage the extreme teeth thereof. To overcome this action I provide a suitable upthrust which consists in the present instance of a series of travelers such as the idlers located above each line of rack links, that is at the side opposite the drive sprockets, and having the lower portions thereof in a line parallel to the line of movement of the links, as shown in Fig. 15. The supports for the idlers are preferably in sectional form, each idler being pivoted on a section which consists of a bracket 85 having an angular flange 86 and is carried by the supporting structure of the machine, as by the beam 87. In the present instance the beam is provided with threaded apertures each receiving a sleeved screw 88 having a head by means of which it may be turned. A headed bolt 89 passes loosely through the sleeve and its lower end is in threaded engagement with the flange of the associated bracket 85 to fasten the bracket to the adjusting screw 88, and receives at its lower end a nut 90 for clamping the bracket on the bolt. As indicated in dotted lines in Fig. 16 the opening in the sleeve is slightly larger than the diameter of the bolt so that the sleeve may be turned. Each bracket is provided at each side with a flange 91 having an elongated aperture 92 and bolts 93 passing through the apertures of adjacent brackets secure the brackets together. Each bracket or section may be adjusted individually to properly position the idler thereon with reference to the step-links, by unloosening the bolts securing the same to the adjacent brackets and then turning the sleeve. By reason of the arrangement described, any tendency of the links to tilt or the steps to rise is avoided by the contact of the flat upper edges of the links with the idlers, and as the latter turn freely the wear between the upthrust and the links is reduced to a minimum.

The footway is designed to be provided at each side with a hand-rail 94 which moves at the same speed as the footway and may be supported in the manner illustrated in Fig. 1. As there shown the hand-rail passes around a vertical pulley 95 at the lower entry landing and after extending horizontally along the landing travels at an incline parallel with the line of movement of the steps to a similar pulley 96 located at the top of the incline. From the pulley 96 the rail passes backwardly to a take-up idler 97 under and over which it passes to a vertical pulley 98 which is located between the pulley 96 and idler 97. From the pulley 98 the rail passes down the incline to and under a pulley 99 and then to the pulley 95. In order to avoid interference between the return run of the hand-rail and that portion passing from the pulley 96 to the take-up idler, the pulley 98 is in a plane parallel with the pulley 96 and the idler 97 is set at such an angle as to have its lower portion in line with the pulley 96 and its upper portion in line with the pulley 98 so as to properly deflect the rail. Any or all of the pulleys may be driven in any suitable manner to impart motion to the hand-rail.

The take-up idler may be mounted in any suitable manner so that it may rotate freely and yet be capable of sliding relatively to the upper pulleys. In the present instance the shaft 100 thereof is provided with a yoke 101 to which is connected a cable 102. This cable is secured to a drum 103 in such manner as to avoid slippage thereof as by being wound about the same, and the drum is mounted on a shaft 104 which may be supported in any suitable manner. The end of the cable beyond the drum is provided with a weight 105. The drum is provided with a ratchet wheel 106 with which coöperates a pawl 107 supported in any suitable manner and preventing backward movement of the drum. With this arrangement the weight takes care of the increment of the stretch of the rail, by taking up slack as the hand-rail stretches, while the ratchet device holds the aggregate of the stretch and prevents the weight from jumping back under sudden and excessive strains on the rail.

The hand-rail may be of any suitable character. In the form illustrated in Fig. 18 it consists of a plurality of separate layers or strips 108 of suitable material, such as canvas. The hand-rail is substantially C-shape in cross-section and the edges 109 of the strips terminate at the cross-sectional ends of the same. The hand-rail is provided with a protecting or wear strip 110 which covers the interior of the hand-rail and also the edges of the strips so as to protect the same from wear. The hand-rail may be composed of the fabric alone, or the canvas or other fabric of the hand-rail may be coated with, cemented together by, or embedded in any suitable material, such as rubber, as indicated in dotted lines in Fig. 12, as is usual in this class of devices.

The upper end-carriage is preferably supported upon rollers 111 resting on tracks 112.

Having described my invention, what I claim is—

1. In a device of the class described, a conveyer, and a sectional upthrust therefor.

2. In a device of the class described a conveyer, and an upthrust therefor consisting of a series of independently adjustable sections.

3. In a device of the class described, a conveyer, and an upthrust consisting of a series of independently adjustable rotating members.

4. In a device of the class described, a conveyer, and an upthrust consisting of a series of adjustable idlers.

5. In a device of the class described, a conveyer, and an upthrust consisting of a series of independently adjustable idlers.

6. In a device of the class described, a conveyer, and an upthrust therefor consisting of a series of independently adjustable sections provided with idlers.

7. In a device of the class described, a conveyer, and an upthrust with which the conveyer is adapted to coöperate and comprising an alined series of adjustable idlers.

8. In a device of the class described, a series of link-connected steps, a driving wheel engaging the links to drive the steps, and an upthrust with which the links are adapted to coöperate and consisting of a series of idlers having the lower portions thereof in a line parallel with the line of movement of the links.

9. In a device of the class described, a series of link-connected steps, a driving wheel engaging the links to drive the steps, and an upthrust to counteract the lifting and tilting action of the driving wheel and comprising a series of idlers, and supports for the idlers.

10. In a device of the class described, a series of link-connected steps, a driving wheel engaging the links to drive the steps, and an upthrust to counteract the lifting and tilting action of the driving wheel and comprising a series of idlers, and independently adjustable brackets on which the idlers are pivoted.

11. In a device of the class described, a series of link-connected steps, a sprocket engaging the links to drive the steps, and an upthrust with which the links are adapted to coöperate under the lifting and tilting action of the sprocket and comprising a series of idlers located at the opposite side of the links from the sprocket and having the lower portions thereof in a line parallel with the line of movement of the links, a bracket on which each idler is pivoted, a support having a threaded aperture, and a threaded sleeve engaging such aperture and fixed to the bracket for adjusting the same.

12. In a device of the class described, a series of link-connected steps, a sprocket engaging the links to drive the steps, and an upthrust with which the links are adapted to coöperate under the lifting and tilting action of the sprocket and comprising a series of idlers having the lower portions thereof in a line parallel with the line of movement of the links, brackets on which the idlers are pivoted, a support having threaded apertures, and threaded sleeves engaging such apertures and fixed to the brackets for adjusting the same, the sides of the brackets being provided with elongated slots, and bolts passing through the slots of adjacent brackets to secure the same together.

13. A hand-rail substantially C-shape in cross section and consisting of a plurality of separate plies of material having the edges thereof terminating at the cross sectional ends of the hand-rail, and a wear strip covering such edges.

14. A hand-rail substantially C-shape in cross section and consisting of a plurality of independent plies of material having the edges thereof terminating at the cross sectional ends of the rail, and a wear strip covering the interior of the rail and also the edges of the plies.

15. A hand-rail substantially C-shape in cross section and consisting of a plurality of separate plies of material having the edges thereof terminating at the cross sectional ends of the rail, a wear strip covering the interior of the rail and also the edges of the plies, and a body, such as rubber, connecting the plies.

16. In a device of the class described, a moving hand-rail, means for automatically taking up the increment of stretch, and automatically acting means for holding the aggregate of stretch.

17. In a device of the class described, a traveling hand-rail, means for taking up the increment of the stretch of the rail, and a pawl and ratchet device for holding the aggregate of such stretch.

18. In a device of the class described, a traveling hand-rail, a weight for taking up the increment of the stretch of the rail, and a pawl and ratchet device for holding the aggregate of such stretch.

19. In a device of the class described, a traveling hand-rail, a take-up idler therefor, a weight constantly acting to move the idler in one direction, and a pawl and ratchet device for preventing movement of the idler in the opposite direction.

20. In a device of the class described, a traveling hand-rail, a sliding take-up idler therefor, a cable connected to the idler and provided with a weight to move the idler in one direction, a drum about which the cable is wound, and a coöperating pawl and ratchet for preventing backward movement of the drum.

21. In a conveyer, a balanced end-carriage for reversing the direction of movement of the conveyer.

22. In a device of the class described, a conveyer, and an end carriage for reversing the direction of movement of the conveyer, and means for balancing the carriage to compensate for the pull and pressure exerted by the conveyer.

23. In a device of the class described, a traveling stairway, an end carriage therefor for reversing the direction of movement of the stairway, and means for maintaining the carriage in a normally balanced position.

24. In a device of the class described, an endless stairway, an end carriage for reversing the direction of movement of the stairway, the said carriage having an inlet and an outlet facing in the same general direction, and springs for balancing the carriage and for returning the same to its balanced position after the movement thereof by the stairway.

25. In a device of the class described, a traveling stairway, an end-carriage therefor provided with tracks, supporting rollers on which the carriage is mounted, and opposing springs for balancing the carriage.

26. In a traveling stairway consisting of a series of wheeled steps, an end-carriage for reversing the direction of movement of the stairway and provided with tracks to coöperate with the wheels of the steps, rollers on which the carriage is supported, and springs acting in opposition to each other to hold the carriage in a normally balanced position and to return the same to such position after movement thereof under the action of the stairway.

27. In a device of the class described, a traveling stairway consisting of a series of wheeled steps, upper and lower ways for the wheels, an end-carriage connecting the upper and lower ways and provided with tracks to coöoerate with the wheels of the steps, supporting rollers for the carriage, cross beams at opposite ends of the carriage and having apertures, and rods connected to the carriage and passing through the apertures in the cross beams and having shoulders at their ends, and expansion springs reacting between the shoulders and the beams to maintain the carriage in and return it to balanced position.

28. In a device of the class described, a traveling stairway consisting of a series of link-connected steps provided with wheels, upper and lower ways for the steps, an end-carriage consisting of two sections connecting the upper and lower ways and provided with tracks for leading the steps from one way to the other, cross beams at opposite ends of the carriage and having apertures, oppositely extending rods on each section of the carriage and passing through the apertures in the beams, adjustable shoulders on the rods and expansion springs interposed between the shoulders and the beams to hold the carriage in a normally balanced position.

29. In a device of the class described, a series of connected sections having front and rear pairs of wheels, upper and lower ways on which the sections travel, a carriage connecting the ways and provided with tracks for the wheels, the tracks for the rear wheels being at opposite ends of the steps and facing in opposite directions inside and outside the line of movement of the rear wheels.

30. In a device of the class described, a series of connected sections having front and rear wheels, upper and lower ways on which the sections travel, a carriage connecting the ways and provided with tracks for the wheels, the tracks for the rear wheels being at opposite ends of the steps, and opposing each other inside and outside the line of movement of the rear wheels.

31. In a device of the class described, a series of connected steps having front and rear pairs of wheels, upper and lower ways on which the steps travel, a carriage connecting the ways and provided with tracks for the wheels, the tracks for the rear wheels at the entrance end of the carriage being at opposite ends of the steps, and located at opposite sides of the line of movement of the wheels.

32. In a device of the class described, a series of connected steps having front and rear pairs of wheels, upper and lower ways on which the said steps travel, a carriage connecting the ways and provided with tracks for the wheels, the tracks for the rear wheels having the same general curvature but facing in opposite directions at the entrance portion of the carriage.

33. In a device of the class described, a series of steps having front and rear pairs of wheels, upper and lower ways on which the steps travel, a carriage connecting the ways and provided with tracks for the wheels the tracks for the rear wheels curving in the same general direction but being located at the opposite sides of the line of movement of the wheels, the wheel at one end of the step being in positive engagement with its associated track at different points in the movement of the step through the carriage.

34. In a device of the class described, a traveling stairway consisting of a series of steps provided with axle bars, oppositely extending wheel-carrying arms on the axle bars, upper and lower ways on which the said steps travel, a carriage connecting the ways and provided with guides with which the steps coöperate in passing through the carriage and tracks for the wheels, the tracks for the rear wheel at one end of the step at the entrance end of the carriage being located at the opposite side of the axis of such wheel from the track for the wheel at the opposite end of the step, whereby one of such wheels is always in tractional engagement with a track as the step passes from the horizontal upwardly through the carriage and tilting of the step on its axle is avoided.

35. In a device of the class described, a traveling stairway consisting of a series of link connected steps provided with axle bars, oppositely extending wheel-carrying arms on the axles, upper and lower ways on which the steps travel, a carriage connecting the ways and provided with continuous channel guides with which the axle bars coöperate in passing through the carriage, the track at the entrance portion of the carriage for the rear wheel at one end of the step being substantially concentric with that for the rear wheel at the other end of the step but located at opposite sides of the line of movement of the wheels, such tracks opposing each other and presenting a tractional surface for at least one of the wheels throughout the length of the tracks to prevent overturning of the step.

36. In a device of the class described, a carriage having tracks for the leading and following wheels of the steps of a traveling stairway, the track for the leading wheels having angular portions connected by a curve, and a yielding section in the curve to receive the impact of the wheels.

37. In a device of the class described, a carriage having tracks for the leading and following wheels of the steps of a traveling stairway, the track for the leading wheels having angular portions connected by a curve, a yielding section in the curve to receive the impact of the wheels, and a spring pressing such section inwardly.

38. In a device of the class described, a carriage having guides for the leading and following wheels of the steps of a traveling stairway, the guide for the leading wheels consisting of a vertical and a horizontal portion connected by a curve and a track parallel with the vertical portion and having a curved end facing the curved portion, and a yielding section in the curved portion.

39. In a device of the class described, a carriage having guides for the leading and following wheels of the steps of a traveling stairway, the guide for the leading wheels consisting of a vertical and a horizontal portion connected by a curve and a track parallel with the vertical portion and having a curved end facing the curved portion, a pivoted section in the curved portion, and a spring for pressing such section toward the curved end of the parallel track.

40. An endless conveyer, and a yielding driving connection between the oppositely moving runs thereof.

41. An endless conveyer, and an automatically adjustable driving connection between the oppositely moving runs thereof.

42. An endless conveyer, a drive for one run of the conveyer, and a connection, yieldable under abnormal strain, between such drive and the other run.

43. An endless conveyer, a drive for one run thereof, and a connection between such drive and the other run automatically adjustable under abnormal strain.

44. An endless conveyer and a normally positive driving connection between the oppositely moving runs of the conveyer, such connection yielding automatically under abnormal strain.

45. An endless conveyer, and a normally positively acting sectional driving shaft between the oppositely moving runs of the conveyer automatically adjustable axially in either direction under normal strain.

46. An endless conveyer, a driving shaft imparting motion to one run of the conveyer, a shaft for driving the other run, and a connecting shaft adapted to yield when subjected to abnormal strain.

47. In a device of the class described, a way, an endless stairway traveling on the way, a driven sprocket engaging one run of the stairway, a sprocket engaging the other run, and a connection between the sprockets and consisting of a plurality of axially adjustable sections.

48. In a device of the class described, a way, an endless series of connected steps adapted to the way, a driven transverse shaft having a sprocket wheel engaging the step connections on one run, a transverse shaft having a sprocket wheel engaging the connections on the other run, and a shaft connecting the transverse shafts and consisting of sections axially adjustable automatically in either direction.

49. In a device of the class described, a way, an endless series of link connected steps adapted to the way, a pair of transverse shafts each associated with one of the runs of the stairway and having a sprocket wheel engaging the links of such run, and a vertical shaft connecting the transverse shafts and consisting of axially adjustable sections, and springs for resisting such adjustment.

50. In a device of the class described, a way, an endless series of link connected steps adapted to the way, a transverse shaft associated with each run of the stairway and having sprocket wheels engaging the links of such run, a shaft having bevel gear connections with the transverse shafts, said shaft consisting of a pair of axially adjustable sections, and springs under tension corresponding to the normal strain of the stairway and adapted to yield under strain in excess thereof.

51. In a device of the class described, a way, an endless series of link connected steps traveling on the way, a transverse shaft associated with each run of the stairway, a vertical shaft having bevel gear connections with the transverse shafts, such shaft consisting of a pair of sections, a coupling connecting the sections and consisting of a pair of members one of which is provided with slots, and the other with bolts adapted to the slots, and springs reacting between the members to resist axial movement thereof.

52. In a device of the class described, a way, an endless series of link connected steps traveling on the way, a transverse shaft associated with each run of the stairway, a vertical shaft having bevel gear connections with the transverse shafts, such shaft consisting of a pair of sections, a coupling connecting the sections and consisting of a pair of members one of which is provided with slots, and the other with bolts adapted to the slots, and springs reacting between the members to resist axial movement thereof in either direction.

53. In a device of the class described, an endless traveling stairway, a driving sprocket associated with and engaging each run of the stairway, an axially adjustable sectional shaft between the sprockets, and means for resisting such axial adjustment corresponding to the normal strain on the sprockets.

54. In a device of the class described, an endless traveling stairway consisting of link connected sections, a transverse driven shaft having a sprocket engaging the link on one run, a transverse shaft having a sprocket engaging the links on the other run, a connecting shaft having bevel gear connections with the transverse shafts and consisting of a sectional shaft each section of which is axially adjustable with reference to the other in either direction, and springs resisting such axial movement and set at a tension corresponding to predetermined resistance on the sprocket but yielding to strain in excess of such predetermined resistance.

55. In a device of the class described, a series of moving steps having front and rear wheels, an end carriage having tracks for the wheels, and means to increase the traction of the wheels on the said tracks.

56. In a device of the class described, a series of moving steps having front and rear wheels, an end carriage having tracks for the wheels, and an adjustable track-section to increase the traction of the wheels on the tracks.

57. In a device of the class described, a series of moving steps having front and rear wheels, an end carriage having horizontal and vertical tracks for the wheels, and an adjustable track-section at or near the lower end of one of the vertical tracks.

58. In a device of the class described, a series of moving steps having front and rear wheels, an end carriage having horizontal and vertical tracks for the wheels, means to increase the pressure of the wheels on the vertical tracks, and means to prevent blow of the wheels on the lower horizontal track.

59. In a device of the class described, a series of moving steps having front and rear wheels, an end carriage having horizontal and vertical tracks for the wheels, an adjustable section in one of the vertical tracks, and a spring section at or near the bottom of the other vertical track.

60. In a device of the class described, a series of link-connected steps, a driving wheel engaging the links to drive the steps, and a sectional upthrust with which the links are adapted to coöperate.

61. In a device of the class described, a series of link-connected steps, a driving wheel engaging the links to drive the steps, and a sectional upthrust to counteract the lifting and tilting action of the driving wheel.

In testimony whereof I affix my signature in presence of two witnesses.

CHARLES D. SEEBERGER.

Witnesses:
W. H. BRADY,
EDMUND E. FIELD, Jr.